United States Patent [19]

Ptacek

[11] Patent Number: 4,501,334

[45] Date of Patent: Feb. 26, 1985

[54] WHEELED EXCAVATOR HAVING A DOZER BLADE AND A BOOM-MOUNTED STABILIZER WHEEL

[75] Inventor: Michael V. Ptacek, Potosi, Wis.

[73] Assignee: Deere & Company, Moline, Ill.

[21] Appl. No.: 511,600

[22] Filed: Jul. 7, 1983

[51] Int. Cl.³ .................. B62D 11/02; E02F 3/96; E02F 9/02

[52] U.S. Cl. .................. 172/832; 280/80 R; 180/22

[58] Field of Search .............. 172/780, 832; 180/6.48, 180/22; 414/720, 694; 280/80 R

[56] References Cited

U.S. PATENT DOCUMENTS

| | | | |
|---|---|---|---|
| 2,698,491 | 1/1955 | Felt | 172/832 |
| 3,027,662 | 4/1962 | Cunningham | |
| 3,903,977 | 9/1975 | Gillette | 280/80 R |
| 4,009,761 | 3/1977 | Meyer | 180/22 |
| 4,023,288 | 5/1977 | Roe | 172/464 |
| 4,029,225 | 6/1977 | Wirt | 414/694 |
| 4,285,627 | 8/1981 | Oswald | 180/6.48 |
| 4,315,636 | 2/1982 | Nakagawa | 280/703 |

Primary Examiner—Richard J. Johnson

[57] ABSTRACT

An excavator has an undercarriage supported on three pair of driven ground wheels. The middle pair of wheels is disposed lower than the remaining wheels so as to enhance the skid-steering ability of the excavator. A dozer blade is mounted to the front of the undercarriage. A caster wheel assembly is mounted to the outer end of the excavator boom and actuators associated with the latter are operable to bring the caster wheel into ground contact ahead of the blade and to exert a down-pressure sufficient to cause the undercarriage to rock rearwardly about the middle pair of wheels to a stabilized condition, where the excavator weight is carried by the middle and rear pair of wheels. Grading operation can be done when the undercarriage is in its stabilized condition.

1 Claim, 2 Drawing Figures

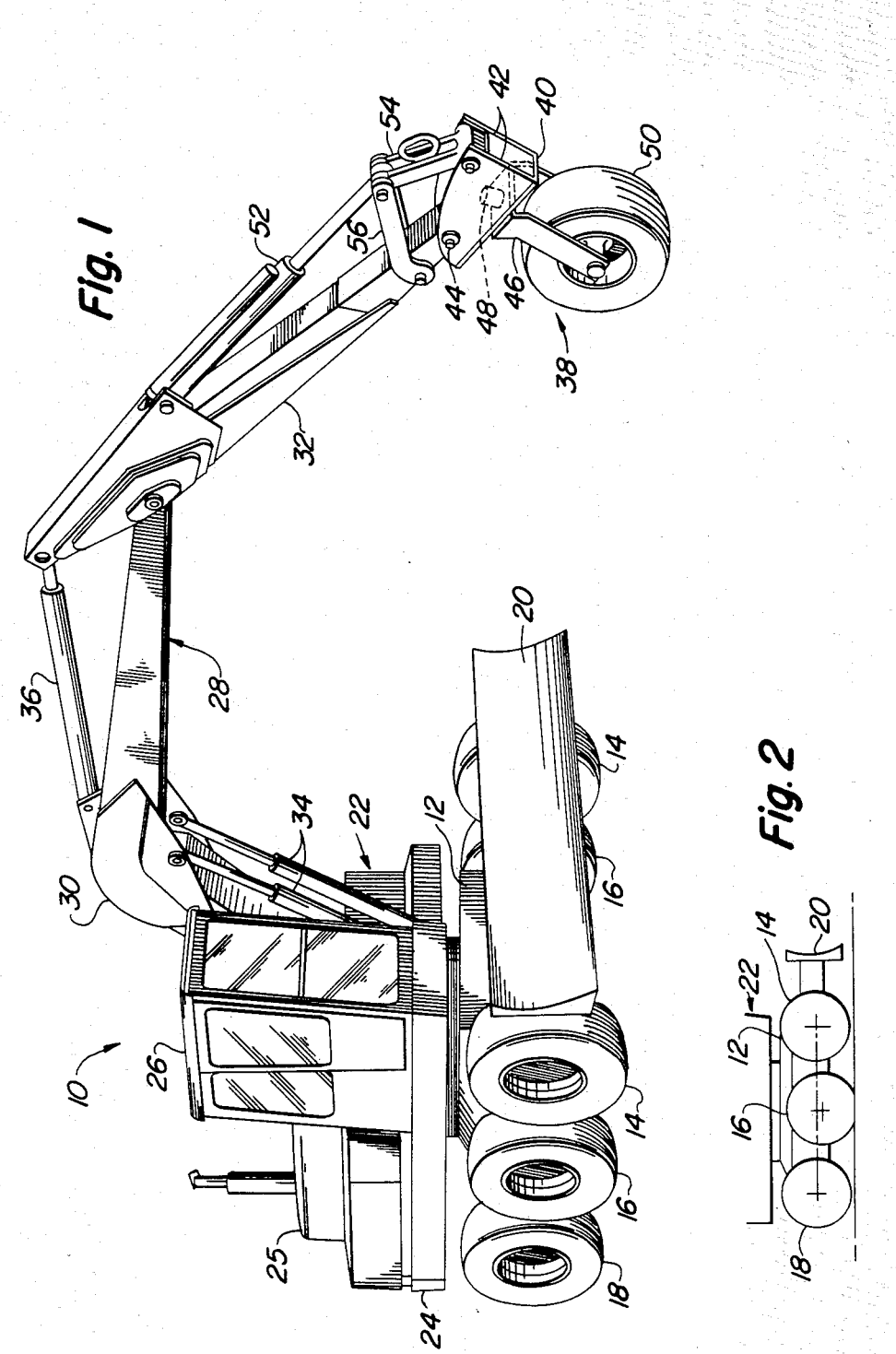

WHEELED EXCAVATOR HAVING A DOZER BLADE AND A BOOM-MOUNTED STABILIZER WHEEL

BACKGROUND OF THE INVENTION

The present invention relates to wheeled excavators and more particularly relates to a skid-steer excavator having a dozer blade coupled to the undercarriage thereof.

A skid-steer excavator having a dozer blade attachment is the subject of U.S. patent application Ser. No. 511,601 filed on July 7, 1983 now U.S. Pat. No. 4,464,852. This excavator is provided with three pairs of ground wheels, with the ground wheels at one side of the excavator being driven separately from the ground wheels at the opposite side of the excavator. The skid-steer function is enhanced by the fact that the middle wheel on the opposite sides of the excavator is disposed at a slightly lower level than the other two wheels. However, this wheel arrangement makes the undercarriage somewhat unstable since it tends to rock to-and-fro about the middle wheel and this rocking movement adversely affects the grading operation of the blade.

SUMMARY OF THE INVENTION

According to the present invention, there is provided an improved wheeled excavator of the type having a dozer blade mounted to its undercarriage.

A broad object is to provide a wheeled excavator with an undercarriage stabilizer that permits a blade mounted to the undercarriage to effectively perform grading operations.

A more specific object is to provide an excavator having its undercarriage supported at each side by three driven wheels with the middle wheel at each side being located at a level below the other two wheels and to mount a wheel on the end of the excavator boom such that it may be engaged with the ground ahead of the blade so as to cause the undercarriage to rock rearwardly about the middle wheels to a stabilized condition wherein the undercarriage is mainly supported by the middle and rear wheels.

These and other objects will become more apparent by reading the ensuing description together with the appended drawing.

BRIEF DESCRIPTION OF THE DRAWING

FIG. 1 is a right front perspective view of a wheeled excavator provided with a blade and a boom-mounted stabilizer wheel.

FIG. 2 is a schematic right side view showing the positioning of the middle wheel relative to the other two wheels at the side of the excavator.

DESCRIPTION OF THE PREFERRED EMBODIMENT

Referring now to the drawing, there is shown a wheeled excavator 10 including an undercarriage or base frame 12 defined in part by right and left-hand, fore-and-aft extending drive housings (not visible). Coupled to drive axles projecting from the housings are front, intermediate and rear pairs of wheels 14, 16 and 18, respectively. The excavator 10 is skid-steered by driving the wheels at one side of the excavator at a speed different than the speed at which the wheels at its other side are driven. To enhance the steering action, the pair of middle wheels 16 are mounted at a lower level than the pairs of wheels 14 and 18 (FIG. 2). A blade 20 is connected to the undercarriage 12 by a structure (not visible) which positions the blade transversely across the front of the excavator just forwardly of the front pair of wheels 14. Preferably, this structure would include a pair of push beams and actuators for selectively raising and lowering the push beams for adjusting the height of the blade 20 so that it could be used for dozing and grading operations.

A superstructure 22 is rotatably mounted on the undercarriage 12 and includes a frame 24 which supports an engine within a housing 25, an operator's cab 26 and an articulated boom structure 28. The boom structure 28 includes an inner boom section 30 vertically pivotally mounted to the frame 24 and an outer boom section or dipper stick 32 vertically pivotally mounted to an outer end of the inner boom section 30. A pair of lift actuators 34 are coupled between the frame 24 and the inner boom section 30 for selectively adjusting the vertical disposition thereof, while an actuator 36 is coupled between the inner and outer boom sections for selectively adjusting the vertical disposition of the outer boom section relative to the inner boom section. Mounted to the outer end of the outer boom section 32, in place of the normally mounted excavator bucket, is a caster wheel assembly 38. The assembly 38 includes a plate 40 having a pair of spaced flanges 42 fixed to the top thereof and a pin 44 vertically pivotally connects the flanges to the end of the boom section 32. A yoke 46 carries an upright shaft 48 swivelly mounted in the plate 40 and a wheel 50 is rotatably mounted to the yoke. An actuator 52 is coupled between the outer boom section 32 and the flanges 42 by a link 54 and coupled between the boom section 32 and the point of connection of the actuator to the link 54 is a radius or guide link 56. Thus, actuation of the actuator 52 will result in the caster wheel assembly 38 being swung vertically about the axis of the pin 44.

To prepare for grading operation, the actuators associated with the boom structure 28 are actuated so as to bring the wheel 50 of the caster wheel assembly into engagement with the ground at a location forwardly of the blade 20. Sufficient down pressure is then exerted on the wheel 50 through operation of one or more of the actuators 34, 36 or 52 so that the undercarriage 12 rocks rearwardly about the middle pair of wheels 16 to support the excavator mainly on the middle and rear pairs of wheels 16 and 18 to thereby stabilize the undercarriage for permitting accurate grading operation.

I claim:

1. In combination with a excavator including an undercarriage supported on front, intermediate, and rear pairs of driven ground wheels with one of the wheels of each pair being driven separately from the other of each pair and with the intermediate pair of wheels being mounted slightly lower than the front and rear pairs of wheels, a superstructure rotatably mounted on the undercarriage and carrying an articulated boom structure and control means therefor, a dozer blade and control means therefor being mounted on the undercarriage, the improvement comprising: wheel means mounted on the boom structure and said control means for the boom structure including means for positioning said wheel means ahead of the blade and exerting down pressure thereon for causing the undercarriage to rock rearwardly about said intermediate pair of wheels so as to bring said rear pair of wheels into firm engagement with the ground and in this way stabilize the excavator for fine grading operation.

* * * * *